US011929924B1

(12) United States Patent
Neustadter et al.

(10) Patent No.: US 11,929,924 B1
(45) Date of Patent: Mar. 12, 2024

(54) ESTABLISHING FORWARD AND REVERSE SEGMENT ROUTING (SR) TUNNELS FOR BIDIRECTIONAL FORWARDING DETECTION (BFD) CONTINUITY CHECKS

(71) Applicant: Ciena Corporation, Hanover, MD (US)

(72) Inventors: Udo Mircea Neustadter, Ottawa (CA); Sudipta Das, New Delhi (IN); Pankaj Verma, Kanpur (IN); Aditya Mittal, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/098,209

(22) Filed: Jan. 18, 2023

(30) Foreign Application Priority Data

Nov. 29, 2022 (IN) .............................. 202211068639

(51) Int. Cl.
*H04L 45/00* (2022.01)
*H04L 45/50* (2022.01)
*H04L 45/74* (2022.01)

(52) U.S. Cl.
CPC ............ *H04L 45/566* (2013.01); *H04L 45/50* (2013.01); *H04L 45/74* (2013.01)

(58) Field of Classification Search
CPC ...... H04L 45/50–45/566; H04L 45/74–45/748
See application file for complete search history.

(56) References Cited

U.S. PATENT DOCUMENTS

| 6,882,627 B2 | 4/2005 | Pieda et al. |
| 6,925,061 B2 | 8/2005 | Lee et al. |
| 7,120,165 B2 | 10/2006 | Kasvand-Harris et al. |

(Continued)

FOREIGN PATENT DOCUMENTS

| CA | 2417680 A1 | 10/2003 |
| CA | 2451888 A1 | 6/2004 |

(Continued)

OTHER PUBLICATIONS

D. Katz et al., "Bidirectional Forwarding Detection (BFD)," Internet Engineering Task Force (IETF), Category: Standards Track, ISSN: 2070-1721, Jun. 2010, pp. 1-49.

(Continued)

*Primary Examiner* — Clayton R Williams
(74) *Attorney, Agent, or Firm* — Baratta Law PLLC; Lawrence A. Baratta, Jr.

(57) ABSTRACT

Systems and methods for monitoring the continuity between endpoints in a network are provided. A process, according to one implementation, includes entering a first list of one or more Segment Identifiers (SIDs) into a Bidirectional Forwarding Detection (BFD) request packet, the first list of one or more SIDs defining a Segment-Routing Traffic-Engineering (SR-TE) forward path from a source node to a destination node. The process also includes entering a second list of one or more SIDs into the BFD request packet, the second list of one or more SIDs defining an SR-TE reverse path back from the destination node that eliminates involvement of a BFD reflector of the destination node. Also, the process includes entering a revised-BFD request into the BFD request packet, the revised-BFD request having a Your Discriminator field set to a discriminator value associated with the source node.

18 Claims, 10 Drawing Sheets

(56) References Cited

U.S. PATENT DOCUMENTS

| | | | |
|---|---|---|---|
| 7,187,652 B2 | 3/2007 | Lee et al. | |
| 7,827,308 B2 | 11/2010 | Neustadter et al. | |
| 10,404,540 B2 | 9/2019 | Sekhri et al. | |
| 10,833,966 B2 | 11/2020 | Mittal et al. | |
| 2019/0238448 A1* | 8/2019 | Pignataro | H04L 45/12 |
| 2021/0250284 A1 | 8/2021 | Aggarwal et al. | |
| 2022/0263752 A1 | 8/2022 | Sharma et al. | |
| 2023/0141362 A1* | 5/2023 | Mittal | H04L 45/34 |
| | | | 370/389 |

FOREIGN PATENT DOCUMENTS

| | | |
|---|---|---|
| CA | 2350449 C | 1/2006 |
| CA | 2417864 C | 8/2009 |
| EP | 1430632 A1 | 6/2004 |
| WO | 2021170092 A1 | 9/2021 |

OTHER PUBLICATIONS

C. Pignataro et al., "Seamless Bidirectional Forwarding Detection (S-BFD)," Internet Engineering Task Force (IETF), Category: Standards Track, ISSN: 2070-1721, Jul. 2016, pp. 1-24.

Dec. 1, 2023, Extended European Search Report issued for European Patent Application No. EP 23 20 5832.

\* cited by examiner

ESTABLISHING FORWARD AND REVERSE SEGMENT ROUTING (SR) TUNNELS FOR BIDIRECTIONAL FORWARDING DETECTION (BFD) CONTINUITY CHECKS

TECHNICAL FIELD

The present disclosure generally relates to networking systems and methods. More particularly, the present disclosure relates to the creation of a forward Segment-Routing Traffic-Engineering (SR-TE) path and a reverse SR-TE path for monitoring continuity between source and destination nodes according to Bidirectional Forwarding Detection (BFD) protocols.

BACKGROUND

Request for Comments (RFC) 5880 generally defines Bidirectional Forwarding Detection (BFD), which is a protocol for checking the continuity (or liveness) between a source node and a destination node. Additional BFD protocols have branched off from RFC 5880. In addition, RFC 7880 generally defines Seamless BFD (S-BFD), which includes a version of BFD that simplifies the communication between the source and destination nodes for monitoring continuity.

Although the BFD and S-BFD protocols are able to provide quick continuity checks between nodes, certain vulnerabilities have been observed. For example, during a completion of an S-BFD implementation, it has become evident that S-BFD allows for a carefully crafted Segment-Routing Traffic-Engineering (SR-TE) tunnel in one direction. That is, only the forward path from the source node to the destination node follows this SR-TE tunnel. The return path might not benefit from a traffic engineered route and may be vulnerable to failures on any best-effort return paths. One issue is that the less desirable return path might lead to unnecessary, and potentially service-unrelated declarations of path failures. As such, certain adjustments are needed in the implementation of S-BFD continuity checking sessions.

FIG. 1 is a diagram illustrating a conventional S-BFD system 10 for performing a conventional S-BFD continuity check according to RFC 7880. In this example, the S-BFD system 10 include a network of nodes arranged in a first domain 12 and a second domain 14, where Node S (in the first domain 12) is designated as a source node and Node D (in the second domain 14) is designated as a destination node. Thus, as described in this example, continuity tests according to BFD and/or S-BFD are performed between Node S (source) and Node D (destination). Intermediate Nodes 1, 2, 3, 4, 5, 6 and various links 16 are arranged in the conventional S-BFD system 10 to provide multiple paths between Node S and Node D. Segment Routing (SR) paths may include Interior Gateway Protocol (IGP) routing and Border Gateway Protocol (BGP) routing techniques. Nodes 2 and 5 may be configured as BGP routers.

In order to perform S-BFD tests, Node S and Node D need to be equipped with an S-BFD entity, which may include any combination of software and hardware. For instance, the S-BFD entity on Node S acts as an Initiator 18 and the S-BFD entity on Node D acts as a Reflector 20, whereby details of the Initiator 18 and Reflector 20 are defined in the S-BFD protocols. The Initiator 18 of Node S creates an S-BFD request packet 22 to be sent to Node D over an SR policy path 24 that defines a route from Node S to Node D. In this example, the SR policy path 24 includes intermediate Nodes 1, 2, 3.

The stack (e.g., label stack) of the S-BFD request packet 22, which is created by the Initiator 18, is also shown in FIG. 1. In this example, the top of the S-BFD request packet 22 includes a Destination Address (DA), a Source Address (SA), and a Virtual Local Area Network (VLAN) identifier, where these three entries form an Ethernet header. Next in the stack of the S-BFD request packet 22 is an SR-TE forward label stack, which includes, in this case, Segment Identifiers (SIDs) 16101, 16102, 16103 for defining the intermediate Nodes 1, 2, 3 for routing the S-BFD request packet 22 along the SR policy path 24. Next in the stack of the S-BFD request packet 22 is an IP header, followed by a User Datagram Protocol (UDP) header, which is then followed by an S-BFD request 25.

Each intermediate node (i.e., Nodes 1, 2, 3) are configured to pop off a respective SID and pass the S-BFD request packet 22 to the next node, until Node D is reached. The Reflector 20 at Node D is then configured to process the S-BFD request contained in the S-BFD request packet 22 after the specified routing of the packet. At this point, the Reflector 20 is configured to create and send a S-BFD reply packet 26 back to Node S. However, as mentioned above, there may be some issues with the return path for this S-BFD reply packet 26.

In particular, a default IP-routed path 28 may be determined, over which the S-BFD reply packet 26 is transmitted. In this example, the default IP-routed path 28 may include Nodes 6, 2, 5, 4, 1, in this order. As shown in FIG. 1, the stack of the S-BFD reply packet 26 includes the DA, SA, and VLAN of the Ethernet header, followed by the IP header, UDP header, and finally a S-BFD response 30, created according to normal S-BFD procedures.

FIG. 2 is a diagram illustrating operations of Node S (source) and Node D (destination) in the conventional S-BFD system 10 of FIG. 1. The Initiator 18 generates the S-BFD request packet 22 with a Destination IP (DIP) address as SR-TE endpoint IP and a source UDP port as 49352. The S-BFD request 25 includes a My Discriminator value as X (e.g., designating Node S), a Your Discriminator value as Y (e.g., designating Node D), a State field of DOWN, and a Demand (D) flag set to 1. The My Discriminator, Your Discriminator, State, and D flag are some of the fields defined in the S-BFD protocols (e.g., RFC 7880) and are set by the Initiator 18 to initiate a continuity test.

A forwarding plane 19a stamps (i.e., stacks, enters, etc.) the forward label stack on top of the S-BFD request 25. For example, the forward label stack includes 1) the Ethernet header including the DA, SA, and VLAN, 2) the SR-TE forward label stack including SIDs 16101, 16102, 16103, 3) the IP header, and 4) the UDP header. In particular, the top of FIG. 2 shows the S-BFD request packet 22 with the details of the IP header and UDP header. In this case, the IP header is an IPv4 header and includes a Source IP of 1.1.1.1 and a Destination IP of 4.4.4.4. The UDP header includes a Source Port of 49352 and a Destination Port of 7784.

Next, the forwarding plane 19b strips off (pops off) the SR-TE label stack from the S-BFD request packet 25. Based on the Destination IP, the packet is sent to the Reflector 20 with the S-BFD request 25 as shown. After normal S-BFD processing by the Reflector 20, the S-BFD response 30 is shown. For example, the My Discriminator is set to Y (e.g., designating Node D), the Your Discriminator is set to X (e.g., designating Node S), the State field set to UP, and the D flag cleared.

According to S-BFD protocols, there are no Multiprotocol Label Switching (MPLS) headers added on the IP-routed path for sending the S-BFD response 30 back to Node S. The S-BFD reply packet 26 includes the Ethernet header, IP header, UDP header, and the S-BFD response 30. At the bottom of FIG. 2, the S-BFD replay packet 26 is shown where the Source IP address is 4.4.4.4 and the Destination IP address is 1.1.1.1 in the IP header (e.g., IPv4 header). Also, the UDP header includes the Source Port being 7784 and the Destination Port being 49352. It may be noted that in conventional S-BFD operation, the IP addresses and Port numbers in the S-BFD request packet 22 are reversed in the S-BFD reply packet 26, which is due to the functioning of the Reflector 20 while processing the S-BFD request. Based on the Destination IP 1.1.1.1, the packet is sent to the Initiator 18 of Node S for processing the continuity test per RFC 7880.

Again, as mentioned above, the conventional S-BFD operation allows for a carefully crafted SR-TE tunnel (e.g., SR policy path 24) in the forward direction. However, the return path (e.g., the default IP-routed path 28) is routed using best-effort IP routing techniques, which may suffer from certain vulnerabilities. Therefore, there is a need in the field of continuity monitoring strategies, such as BFD and S-BFD, to inject a packet at the source for creating a forward SR-TE tunnel while also injecting reverse path specifics associated with transmission from the destination back to the source using a well-defined SID list for propagating the reply packet along a reverse path having the advantage of a traffic engineered SR tunnel. Also, there is also a need for simplifying the BFD and S-BFD even further to allow the source node to monitor the continuity status without the need for operations by the Reflector 20.

BRIEF SUMMARY

The present disclosure is directed to continuity checks between endpoints in a communications network, such as those related to BFD and S-BFD protocols. In one implementation as described in the present disclosure, a process includes the step of entering a first list of one or more Segment Identifiers (SIDs) into a Bidirectional Forwarding Detection (BFD) request packet. The first list of one or more SIDs defines a Segment-Routing Traffic-Engineering (SR-TE) forward path to the destination node. The process also includes the step of entering a second list of one or more SIDs into the BFD request packet. The second list of one or more SIDs defines an SR-TE reverse path back from the destination node that eliminates involvement of a BFD reflector of the destination node. Also, the process includes the step of entering a revised-BFD request into the BFD request packet, where the revised-BFD request has a Your Discriminator field set to a discriminator value associated with the source node.

According to some embodiments, the process may further include the step of transmitting the BFD request packet to the destination node via the SR-TE forward path. The second list of one or more SIDs may be stacked in the BFD request packet according to the Multiprotocol Label Switching (MPLS) protocol such that the destination node denies visibility of the revised-BFD request by the BFD reflector and returns the BFD request packet back to the source node via the SR-TE reverse path. A source node that is configured to execute the process may include a BFD initiator configured to process the revised-BFD request that was previously unprocessed by the BFD reflector of the destination node, whereby the BFD initiator does not drop the revised-BFD request on account of the Your Discriminator field being set to the discriminator value associated with the source node.

The process may also include the step of entering an Internet Protocol (IP) header into the BFD request packet and setting a destination IP address of the IP header to 127.x.x.x reserved for loopback, whereby the destination IP address remains the same in the SR-TE reverse path. The process may also include the step of entering a User Datagram Protocol (UDP) header into the BFD request packet, set a source port number of the UDP header to an unreserved value, and set a destination port number of the UDP header to 3784 as defined in RFC 5881, whereby the source port number and destination port number may be configured to remain the same in the SR-TE reverse path.

The step of entering the second list of one or more SIDs into the BFD request packet for defining the SR-TE reverse path may include the step of entering a Binding SID (B-SID) that the destination node expands to form the second list. According to some embodiments, the SR-TE forward path and SR-TE reverse path may include the same intermediate nodes between the source node and destination node.

According to additional embodiments, the process may include the step of setting a State field of the revised-BFD request to DOWN and utilizing a Finite State Machine (FSM) having a revised-BFD policy associated with the revised-BFD request. For example, the FSM may be configured, in accordance with the revised-BFD policy of the present disclosure, to transition the State field to UP in response to receiving the revised-BFD request via the SR-TE reverse path. The FSM may be configured to transition the State field to DOWN in response to a timeout event that indicates a continuity fault. For example, the procedures may be irresponsive to an INIT state, and three-way handshaking procedures. The revised-BFD request described herein may involve an Internet-Protocol Single-Hop (IP-SH) operation.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for monitoring the continuity (or liveness) between two nodes in a network. In particular, the embodiments described herein related to Bidirectional Forwarding Detection (BFD) and Seamless BFD (S-BFD) protocols. However, the present disclosure describes embodiments that may be considered to be a "revised" version of BFD, which, in a way, may be a modification of the BFD protocol and simplifies both BFD and S-BFD operations.

S-BFD over SR-TE

Segment Routing (SR) is a routing protocol that was developed from the Source Routing protocol. In a segment routed system, a source or ingress node may stack a header within a packet where the header lists of number of segments (or portions) of paths. The header may include Segment Identifiers (SIDs) used to define a forwarding route comprising the multiple segments for propagating the packet to a specific destination node. SR may operate on top of a Multiprotocol Label Switching (MPLS) network or Internet Protocol version 6 (IPv6) network.

Segment-Routing Traffic-Engineering (SR-TE) fault monitoring may use S-BFD as described in RFC 7880. However, as demonstrated below, this may have issues with respect to unreliable return paths along which a S-BFD response packet will travel from the destination node back to the source node. A S-BFD request (e.g., a Continuity Check (CC) request) takes traffic-engineered paths in a forward direction (i.e., from a source or head-end to the destination or tail-end). The S-BFD request may be defined by a network operator or administrator or by Path Computation Element Protocol (PCEP). However, instead of returning the S-BFD response over an SR-TE path, conventional systems propagate the S-BFD response over a best-effort IP-routed return path in the tail-to-head direction. It should be noted, however, that packets traversing the IP-routed return path may be subject to latency, jitter, and/or other shortcomings along this best-effort path. Thus, according to the embodiments described with respect to FIGS. 5 and 6, reliable fault monitoring over SR-TE or candidate paths can be achieved by traversing BFD reply packets over a traffic-engineered path, such as an SR-TE path.

Attempt to Improve S-BFD

Figure 3:
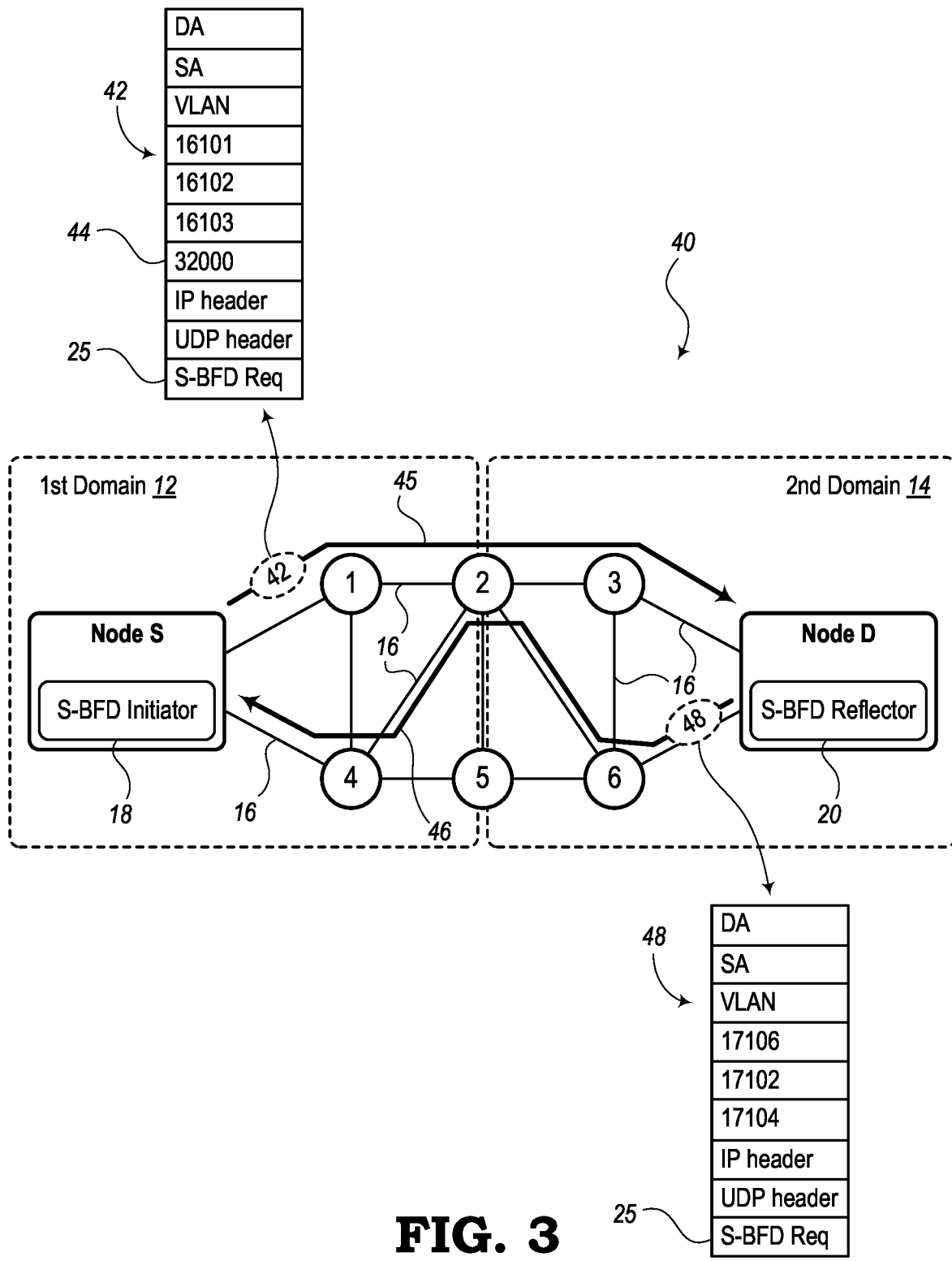
FIG. 3 is a diagram illustrating an S-BFD system using a loopback procedure for automatically returning an S-BFD request according to one implementation.

FIG. 3 is a diagram illustrating an embodiment of an S-BFD system 40 using a loopback procedure for automatically returning an S-BFD request. It may be noted that the S-BFD system 40 and description thereof, as explained with respect to FIGS. 3 and 4, may represent a previous attempt to improve S-BFD and may have issues of its own.

Figure 4:
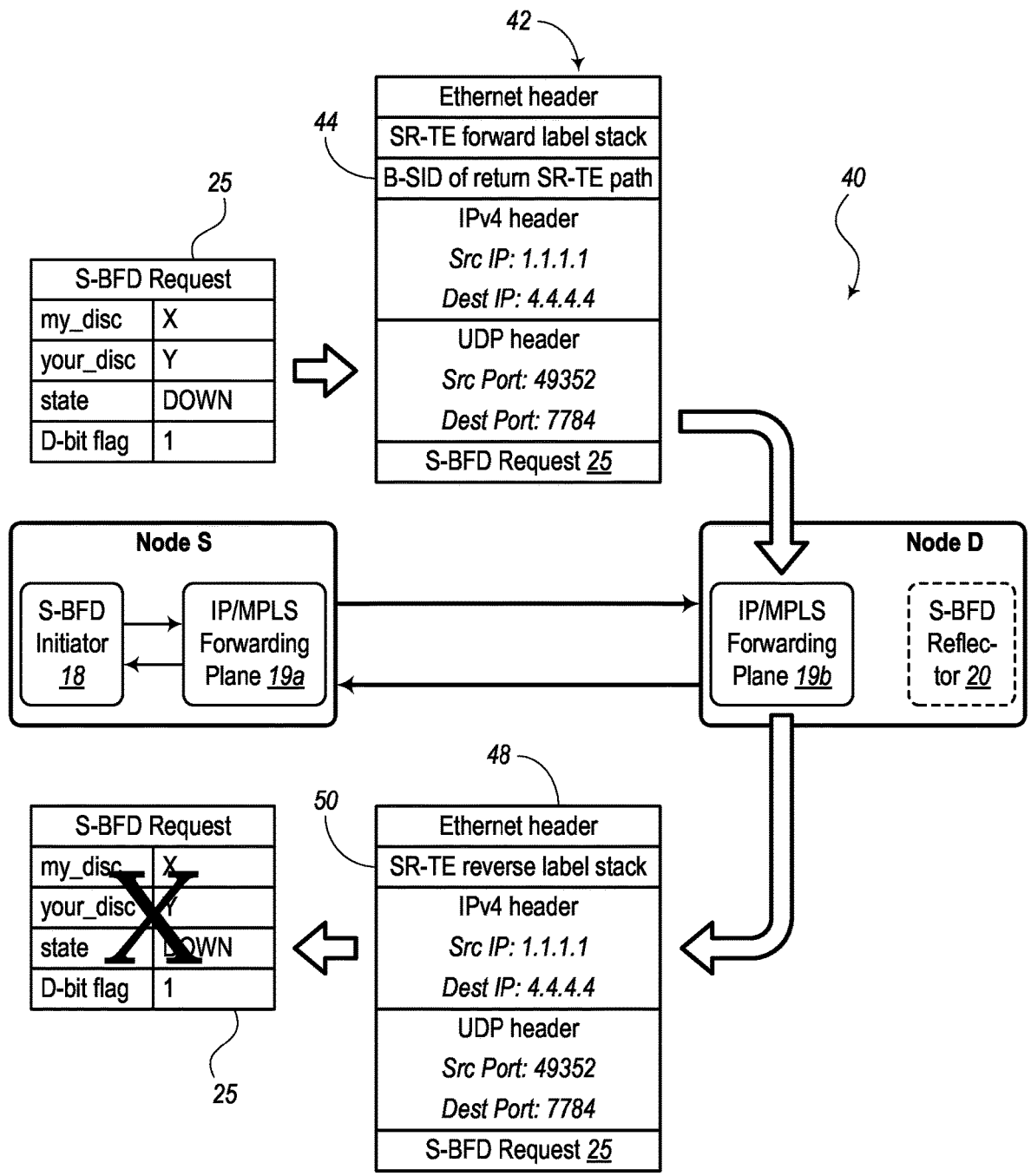
FIG. 4 is a diagram illustrating operations of a source node and destination node in the S-BFD system of FIG. 4 and issues associated with this implementation.

Thus, the embodiments described below with respect to FIGS. 5-11 may represent preferred embodiments in the present disclosure. FIG. 4 is a diagram illustrating operations of Node S and Node D in the S-BFD system 40 of FIG. 3 and provides an explanation of issues associated with this implementation.

Figure 1:
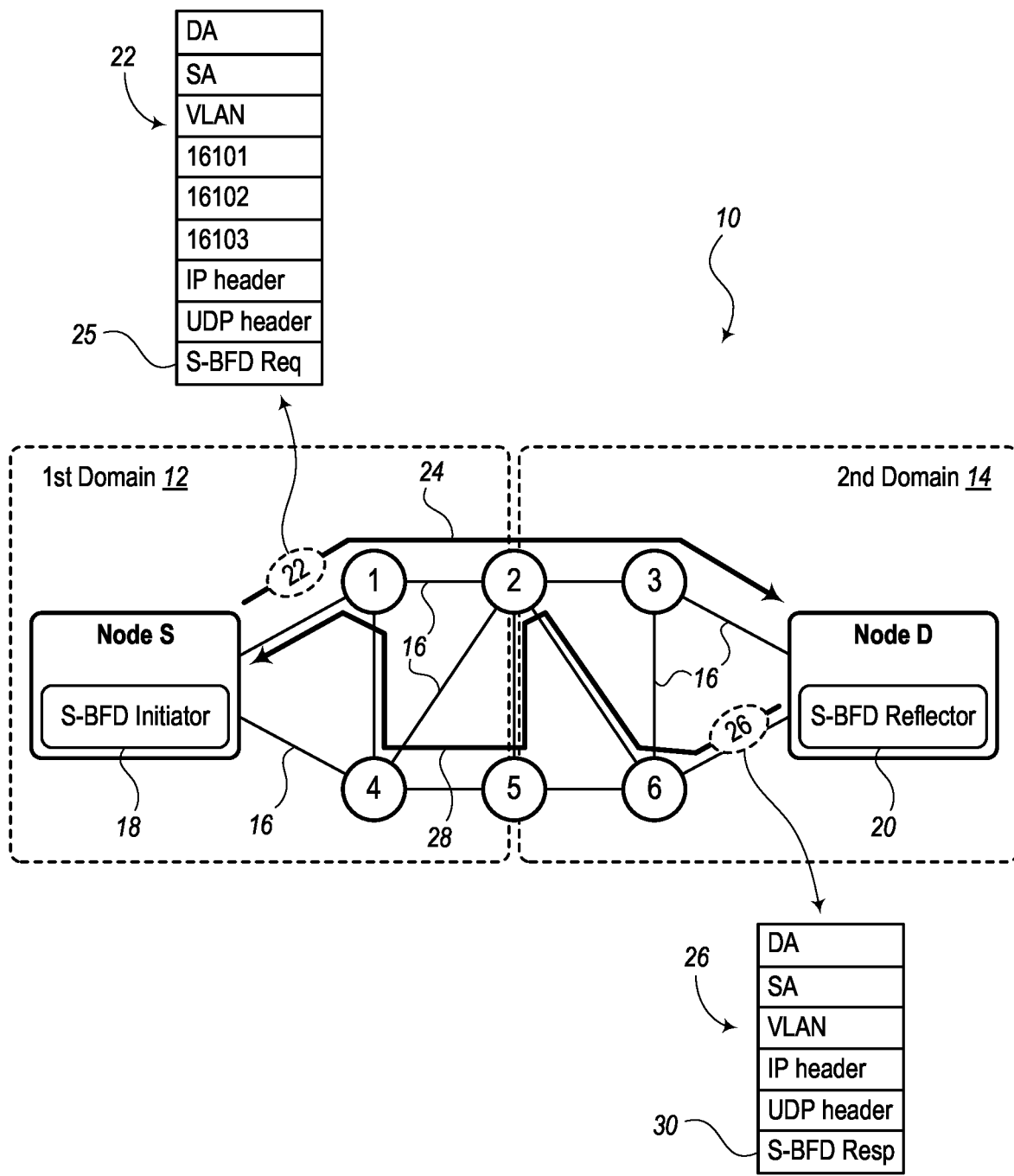
FIG. 1 is a diagram illustrating a conventional Seamless Bidirectional Forwarding Detection (S-BFD) system for performing a conventional S-BFD continuity check according to RFC 7880.
Figure 2:
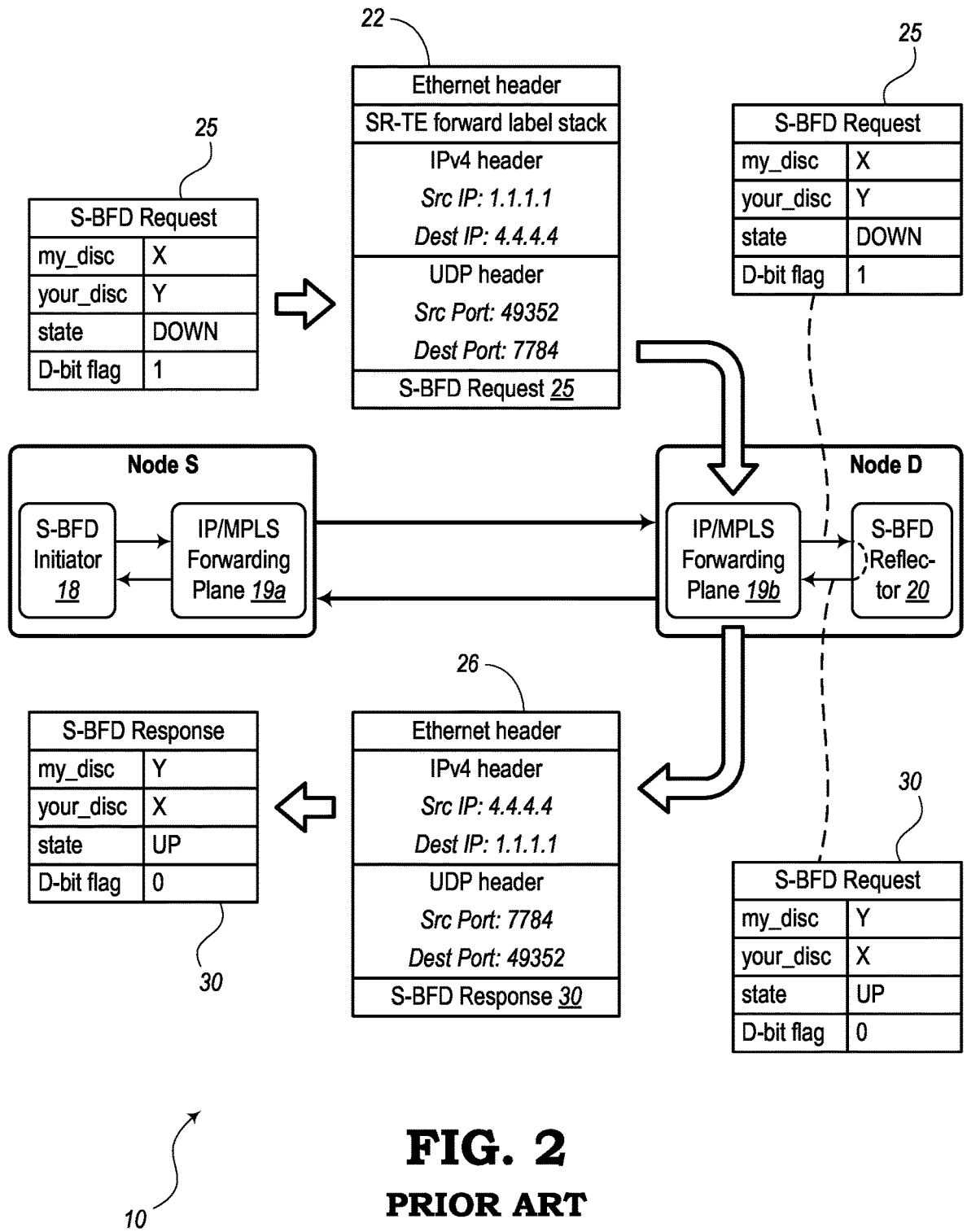
FIG. 2 is a diagram illustrating operations of a source node and destination node in the conventional S-BFD system of FIG. 1.

The S-BFD system 40 includes essentially the same components as described above with respect to FIGS. 1 and 2. However, the Initiator 18 of Node S is configured to create a S-BFD request packet 42 that differs from the S-BFD request packet 22 described with respect to FIGS. 1 and 2. The S-BFD request packet 42 includes the Destination Address (DA), Source Address (SA), and VLAN identifier, which make up an Ethernet header. The S-BFD request packet 42 also include SIDs (e.g., 16101, 16102, 16103), which make up an SR-TE forwarding label stack for forwarding over the SR policy path 24 defining the SR-TE forwarding path.

In this embodiment, the S-BFD request packet 42 further includes a Binding SID (B-SID) 44. In this case, the B-SID 44 includes value "32000," which can correspond to a SID list for transmission in the reverse direction. For example, from Node D to Node S, the B-SID 44 of 32000 may correspond to another SR policy path 46. In one example, the B-SID 44 representing the SR policy path 46 may be expanded to include a list of SIDs including 17106, 17102, 17104 for following a path through Nodes 6, 2, and 4, in this order. The rest of the S-BFD request packet 42 is the same as the S-BFD request packet 22 shown in FIG. 1 and includes the IP header, UDP header, and S-BFD request 25. It should be noted that the S-BFD request 25 in this embodiment is the same as in the conventional system.

Node D receives the S-BFD request packet 42. However, instead of delivering the S-BFD request 25 to the Reflector 20, the B-SID 44 is expanded to provide additional SIDs in the routing, thereby passing through Node D while eliminating involvement by the Reflector 20. According to the routing information included in the B-SID 44, the S-BFD request packet 42 is reversed along the SR policy path 46 headed back to Node S. This is a data path loopback process based on the B-SID expansion.

The return packet 48 that returns on the SR policy path 46 is essentially the same S-BFD request packet 42 sent from Node S to Node D. The return packet 48 at this point still includes the DA, SA, and VLAN entries of the Ethernet header, the expanded SID list of SIDs 17106, 17102, 17104 for directing along the SR-TE path defined by the SR policy path 46, the IP header, the UDP header, and the same S-BFD request 25 that was initiated by the Initiator 18. The UDP header in this case may include a Destination port value of 3784, which has a certain significance as described in RFC 5881.

The strategy shown here in FIG. 3 is therefore able to provide a quicker response by eliminating involvement by the Reflector 20 and is able to propagate the reverse packet along a SR-TE path (e.g., SR policy path 46). However, a problem in this case is that the Initiator 18 might discard the returned packet since the original S-BFD request includes source and destination information that was not reversed according to normally S-BFD behavior on account of the Reflector 20 being bypassed.

As shown in FIG. 4, the Initiator 18 generates an S-BFD request packet 42 with a DIP as the SR-TE endpoint IP and the source UDP port of 49352, as before. The S-BFD request 25 is also the same as before. The forwarding plane 19a stamps the forwarding label stack on the S-BFD request 25. The top of FIG. 4 shows the S-BFD request packet 42 with the Ethernet header, SR-TE forward path label stack, the newly added B-SID 44 of the return SR-TE path, the IP header, the UDP head, and the same S-BFD request. The forwarding plane 19a strips off (pops) the SR-TE forwarding label stack and stamps the label stack corresponding to the programmed B-SID on the S-BFD request packet 42.

It may be noted that the Reflector 20 has no visibility of the S-BFD request packet 42 since the S-BFD request packet 42 is loaded with the expanded SIDs from the B-SID code and the packet is reversed onto the return path. The return packet 48 includes the Ethernet header and the SR-TE reverse path label stack 50 created from the B-SID. Also, the return packet 48 includes the same IP header information and UDP header information as the S-BFD request packet 42 since the Reflector 20 does not reverse these values for the source and destination. Also, the same S-BFD request 25 remains intact since it was not processed by the Reflector 20.

Next, the forwarding plane 19b strips off the label stack and may send the return packet 48 to the Initiator 18 for further S-BFD processing. However, the return packet 48 in this embodiment may be dropped or discarded by Node S since the destination information is set for Node D, not Node S. Also, since the Your Discriminator value Y is set for Node D, the Initiator 18 may drop the S-BFD request 25.

Computing System

Figure 5:
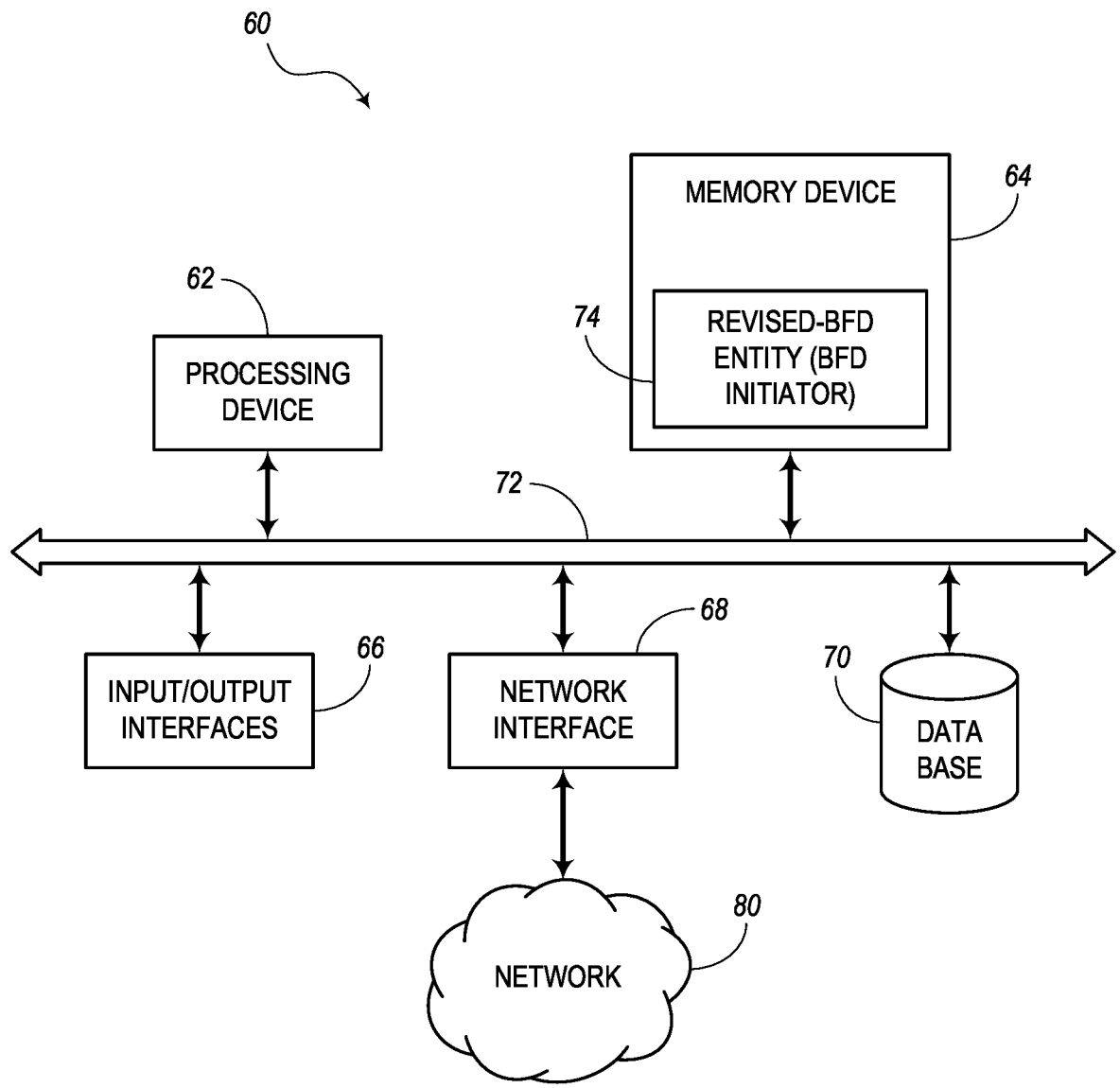
FIG. 5 is a block diagram illustrating a computing system of a node operating in a revised-BFD system, according to various embodiments of the present disclosure.

FIG. 5 is a block diagram illustrating an embodiment of a computing system 60 of a node operating in a revised-BFD system. In the illustrated embodiment, the computing system 60 may be a digital computing device that generally includes a processing device 62, a memory device 64, Input/Output (I/O) interfaces 66, a network interface 68, and a database 70. It should be appreciated that FIG. 5 depicts the computing system 60 in a simplified manner, where some embodiments may include additional components and suitably configured processing logic to support known or conventional operating features. The components (i.e., 62, 64, 66, 68, 70) may be communicatively coupled via a local interface 72. The local interface 72 may include, for example, one or more buses or other wired or wireless connections. The local interface 72 may also include controllers, buffers, caches, drivers, repeaters, receivers, among other elements, to enable communication. Further, the local interface 72 may include address, control, and/or data connections to enable appropriate communications among the components 62, 64, 66, 68, 70.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

In particular, the computing system 60 includes a revised-BFD entity 74, which is configured to perform the functions of a revised-BFD procedure as described herein with respect to the preferred embodiments. Specifically, the revised-BFD procedure, as executed with assistance from the revised-BFD entity 74, includes the process of defining an SR-TE reverse path, while also eliminating the need for the involvement of the Reflector at the destination node. These actions are performed while also avoiding the possibility that the source node might drop the BFD request.

Again, the previous solutions include several issues, such as an unreliable IP return path. This issue, for example, can be mitigated by the S-BFD initiator node (e.g., Node S) additionally stacking a B-SID defining a reverse SR-TE tunnel configured from the tail-end back to the head-end. With this approach, as with FIGS. 3 and 4, the S-BFD response packets can be looped back from Node D onto a specified SR-TE tunnel by virtue of B-SID expansion of multiple SIDs identifying multiple traffic-engineered segments defining the return tunnel.

However, as explained with respect to FIGS. 3 and 4, simply echoing the original S-BFD request without involvement by the Reflector 20 suffers from other drawbacks. The S-BFD packets will be looped-back directly on the data path at the tail node and the S-BFD Reflector 20 configured on tail node will not have any visibility of these CC request packets. Thus, the S-BFD Initiator 18 on head node will receive back the CC request which it had originally generated. However, with the Your Discriminator being unrelated to the head node, these packets will be dropped there. Hence, the S-BFD session will never become operationally UP. The reason that the S-BFD session never transitions to the UP state is that the Reflector 20 never has visibility of the request and never swaps certain fields that would normally be swapped in conventional BFD and S-BFD operation. Particularly, the Reflector 20 never swaps the Source-IP and Destination-IP addresses, never swaps the Source and Destination UDP ports, never swaps the My Discriminator and Your Discriminator values, never changes the BFD state, etc. IP header, UDP header, and BFD header as it normally would while generating such as response. When Node S gets the reply back, the BFD request 25 has the wrong destination address and, thus, Node S discards the BFD request packet 48. Therefore, the standard S-BFD protocol cannot be used to monitor the SR-TE tunnels or candidate paths where S-BFD response packets are required to be over a traffic-engineered path.

However, the computing system 60 and revised-BFD entity 74 are configured to use an IP Single-Hop (IP-SH) procedure, which may be referred to herein as a "BFD Lite" procedure. The IP-SH procedure or BFD Lite procedure includes aspects of conventional BFD, but revises some of the specifics of the protocol to include a simpler and quicker continuity checking technique. Also, the IP-SH procedure or BFD Lite procedure does not even require the knowledge of its actions by other nodes, but instead can act alone with any destination node to obtain the same continuity checking information. Thus, the embodiments of the present disclosure are configured to achieve one particular goal of improving S-BFD by eliminating the need for the Reflector entity at a destination node.

According to some embodiments, the revised-BFD entity 74 may be configured as a BFD Initiator, but may also include Reflector functionality to perform regular Reflector operations with respect to requests from other nodes. When used as a Reflector, the revised-BFD entity 74 swaps the IP, UDP, and discriminator information between the source and destination information.

Therefore, some embodiments of the present disclosure may include a source node that performs continuity checking with a destination node. The source node may be configured with hardware and/or software for a modified version of BFD, such as a BFD entity (e.g., the revised-BFD entity 74), which may be capable of being an initiator and/or a reflector. The revised-BFD entity 74, which may be implemented in any suitable combination of hardware and/or software in the source node (e.g., Node S) may be configured to enable the processing device 62 to perform certain functions. For example, the revised-BFD entity 74 may be implemented in a non-transitory computer-readable medium (e.g., the memory device 64) having instructions that cause one or more processors (e.g., processing device 62) to enter a first set of one or more Segment Identifiers (SIDs) into a label stack, where the first set of one or more SIDs defines a Segment-Routing Traffic-Engineering (SR-TE) forward path to the destination node. The revised-BFD entity 74 also enables the processing device 62 to enter a second set of one or more SIDs into the label stack, wherein the second set of one or more SIDs defines an SR-TE reverse path back from the destination node that eliminates involvement of a Bidirectional Forwarding Detection (BFD) reflector of the destination node. The revised-BFD entity 74 is also configured to cause the processors to enter a BFD request that has the Your Discriminator field equal to its own discriminator so that the BFD request will not be dropped by a BFD initiator of the source node.

In some embodiments, the revised-BFD entity 74 may be configured to use a modified Finite State Machine (FSM) to interpret fields in the BFD (or S-BFD) protocol in a different way, but are still configured to perform the BFD continuity check. The source node causes the destination to simply return the BFD request packet along the defined return path based on the second SID list. In some embodiments, this second SID list for the return path may be a Binding SID (B-SID) that can be expanded to form the second SID list. Again, the SIDs (or B-SID) will be the next processed labels in the stack of the BFD request packet, which will automatically cause Node D to simply forward the packet to the next node in the stack, which will avoid visibility of the BFD request by the destination reflector.

Also, some embodiments of the present disclosure may include features where the revised-BFD entity 74 is configured to define the forwarding path and reverse path by include entering SIDs and/or B-SIDs into label stack. This may be done by an Initiator entity of the source node, where the Initiator entity may essentially be similar to the BFD Initiator described herein.

The continuity test may be similar to or related to BFD or S-BFD, but instead is an IP-SH BFD (or BFD Lite) procedure. The B-SID entered for the reverse path may be used in place of one or more second set of SIDs. Also, another B-SID may also be entered for the forward path as well, particularly if multiple domains are traversed from Node S to Node D.

In some embodiments, the forward path and reverse path may be the same. That is, the intermediate nodes between the source and destination may be the same in some cases, where the lists would simply be reversed. According to various embodiments, the TE-defined reverse path may be calculated independently on a best-effort IP path.

The BFD reflector on the destination node does not "see" the BFD request packet (or BFD request). In other words, the BFD request packet is looped back directly by the destination node without being viewed or processed by the Reflector to thereby "bypass" the Reflector. Instead, the destination node handles the packet according to the label stack (e.g., B-SID) according to normal MPLS protocol. As such, the destination may be completely unaware that a BFD-type request is even being performed since the source node can work independently of the destination according to the embodiments described herein. In fact, the destination does not need to know how the revised-BFD entity 74 works, because the source can insert the B-SID and BFD entries to perform the continuity test without the destination's knowledge.

The source node, using the revised-BFD entity 74 can receive the same BFD request that it sent and then use the modified BFD actions described herein for handling the BFD packets. In the IP header of the label stack created by source node, the destination IP address may be set to "127.x.x.x," which is reserved for loopback and is unchanged in the reverse path. Also, in the UDP header of the label stack created by source node, the source port can set a new (previously unused) number ("49452") and can set the destination port to "3784" as defined in RFC 5881. Again, these values or fields remain the same in the reverse path. Also, the revised-BFD entity 74 is configured to set My Discriminator equal to Your Discriminator, which is equal to the discriminator of the source node itself.

Therefore, without the need to swap source and destination information according to normal BFD and S-BFD behavior, these IP addressed, UDP port numbers, etc. remain the same in the forward direction and reverse direction and are set such that the packets will not be dropped by the destination node or other intermediate nodes. This, of course, greatly simplifies BFD and S-BFD and can be considered to be a more straight-forward approach. Thus, the revised BFD procedures may be referred to as "BFD Lite."

Without the conventional swapping of source and destination information, the only BFD feature that is used in the embodiments of the present disclosure is the "timeout" feature. Therefore, the only way that the revised BFD procedures of the present disclosure detect faults between source and destination is by using BFD timeout expiration.

Thus, the simplified BFD versions described herein do not use the INIT state, three-way handshaking, and timer manipulation of BFD.

The revised-BFD entity 74 may be used in any suitable platform that has control-plane-assisted BFD hardware implementation. The revised-BFD entity 74 is a simplified version (or branch) of BFD (i.e., RFC 5880) and, in a sense, avoids the S-BFD branch altogether.

In operation, the Initiator sets the state to DOWN to start the revised BFD procedure. Then, when the BFD request returns (i.e., unchanged), the FSM of the Initiator changes to the UP state in response to receiving a DOWN state. Subsequently, upon receipt of BFD packet requests with an UP state, the FSM remains in the UP state. That is, the only thing that changes the state to a DOWN state is when there is a timeout expiration.

The BFD request packet may encapsulate the SID list for the forward SR-TE path and a SID list (or B-SID) for the reverse SR-TE path. The defined reverse SR-TE path avoids indeterministic behavior due to IP reverse path, which improves network resiliency and stability.

Revised-BFD System and Operations Thereof

Figure 6:
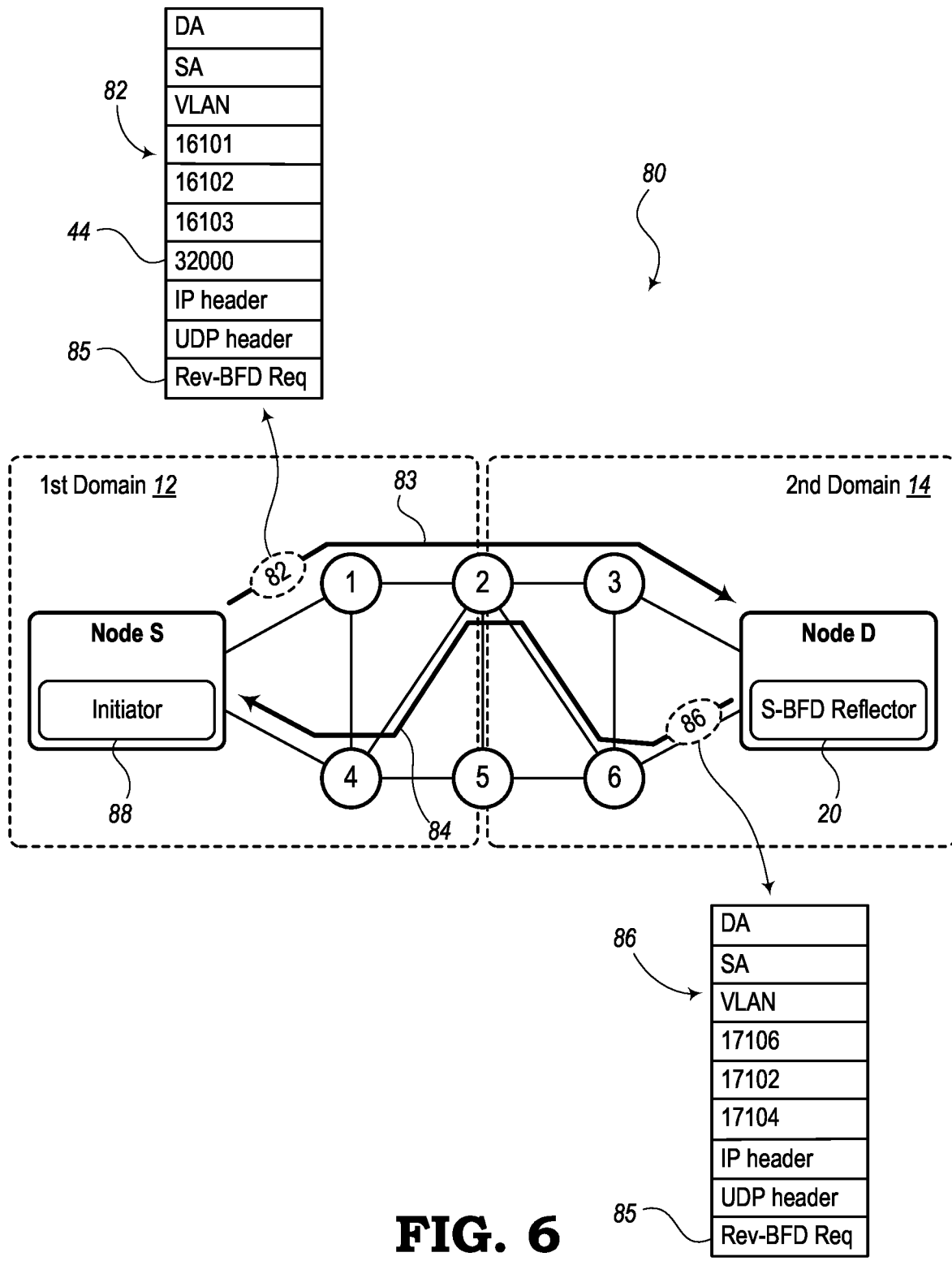
FIG. 6 is a diagram illustrating a revised-BFD system according to a preferred embodiment for overcoming the issues associated with the S-BFD system of FIG. 3.

FIG. 6 is a diagram illustrating a preferred embodiment of a revised-BFD system 80 for reliably monitoring the liveness of forward SR-TE (or candidate paths) of a given forward SR-TE tunnel while also overcoming the issues associated with the S-BFD system 40 of FIG. 4. Instead of the S-BFD request packet 42 used in FIG. 4, the revised-BFD system 80 generates a revised-BFD request packet 82 according to the IP-SH BFD or BFD Lite functionality described herein. The revised-BFD request packet 82 includes many of the same fields as described with respect to the BFD request packet 42 of FIG. 4, such as the stacked SID list for enabling propagation in the forward direction along a forward SR-TE path 83 and the B-SID 44 for enabling propagation in the reverse direction along a reverse SR-TE path 84. However, at the bottom of the stack, the revised-BFD request packet 82 includes a revised-BFD request 85 (e.g., IP-SH request, BFD Lite request, etc.), described below with respect to FIG. 7.

Figure 7:
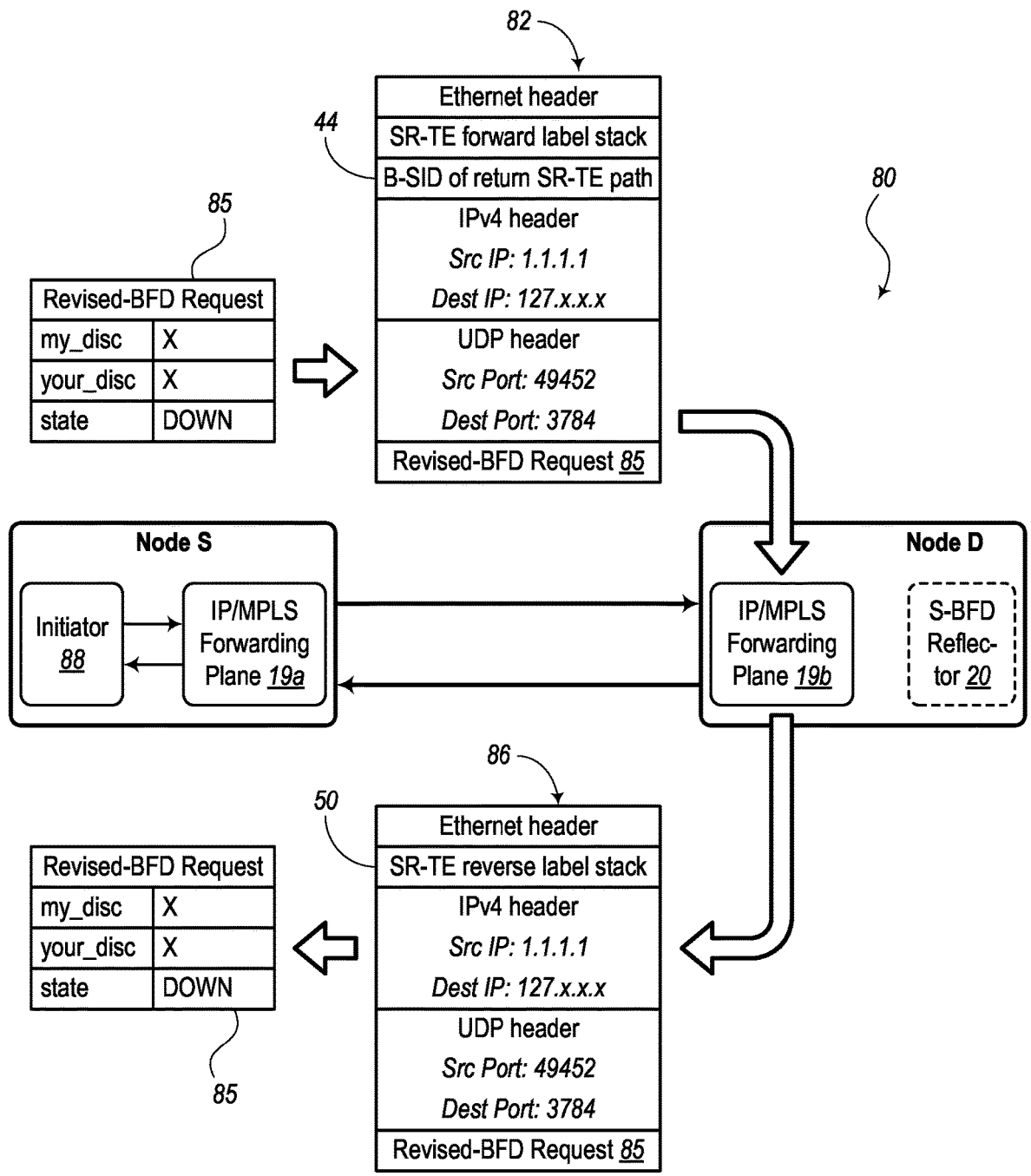
FIG. 7 is a diagram illustrating operations of a source node and destination node in the revised-BFD system of FIG. 6, according to various embodiments.

FIG. 7 is a diagram illustrating operations of a head-node (Node S) and tail-node (Node D) in the revised-BFD system 80 of FIG. 6. There may be a single IP-SH BFD endpoint provisioned at head-node (i.e., Node S). By virtue of B-SID expansion on the tail-node (i.e., Node D), BFD packets may be looped back directly into the data plane of the tail-node. Here, these packets may be processed as MPLS B-SID packets, forwarding the packets to the B-SID-selected reverse SR-TE path 84, back to the head-node. At the head-node, the same BFD session is consumed by the revised-BFD entity 74 (e.g., initiator), which monitors the received-BFD request packets 82. Further, there is no need to provision any BFD reflector session on the tail-node, as would normally be needed for standard S-BFD implementation.

As shown in FIG. 7, the revised-BFD request 85 includes the My Discriminator value set to X (e.g., the discriminator identifying the head-node), the Your Discriminator value also set to X, and the state set to DOWN. In this embodiment, the D bit (flag) may be "don't care" since the revised-BFD procedures described herein may not need to use this field.

In order to use the revised-BFD request packets 82 to monitor the forward SR-TE path 83 and reverse SR-TE path 84, the head-node creates the revised-BFD request packets 82 according to BFD constructs, where the SR-TE head-node can consume the revised-BFD request packets 82 that it has generated. To achieve this, the destination IP address of subnet 127/8 (or "127.x.x.x") may be used in the IP header of the BFD packets. Also, the head-node may configure the SR-TE source IP address in the IP header of the revised-BFD request packets 82 as 1.1.1.1 designating Node S. It may be noted that there is a differentiation between conventional BFD and the present SR-TE BFD.

Also, Node S (e.g., using the revised-BFD entity 74) may also be configured to define a new Source UDP port for BFD for monitoring the forward and reverse SR-TE paths 83, 84. Here, the Destination UDP port may remain the same as defined in RFC 5881 (i.e., 3784). This may include learning of the remote BFD discriminator. Node S may set the remote discriminator equal to local discriminator (which is allocated by the local node). This further allows de-multiplexing of session based on the Your Discriminator field.

The reverse SR-TE path 84 carries the reversed packet 86, where the Ethernet header is generated as per MPLS/IP routing rules, the forward SR-TE SIDs have been popped, the B-SID for the reverse SR-TE path 84 has been expanded, the IP header remains intact, the UDP header remains intact, and finally the revised-BFD request 85 remains intact. The forwarding plane 19b is configured to strip off the reverse path label stack along the intermediate nodes (e.g., Node 6, Node 2, Node 4). Since the destination IP address is set to 127/8 and the UDP destination port is set to 3784, the intermediate nodes and Node S do not drop the reversed packet 86.

The Initiator 88 (e.g., revised-BFD entity 74) of Node S is configured to receive the reversed packet 86. The Initiator 88, according to the embodiments of the present disclosure, is configured to obtain the revised-BFD request 85 just as it was originally transmitted. That is, the My Discriminator and Your Discriminator are still set to X and the state is still DOWN.

Finite State Machine and Operations of Revised-BFD System

Figure 8:
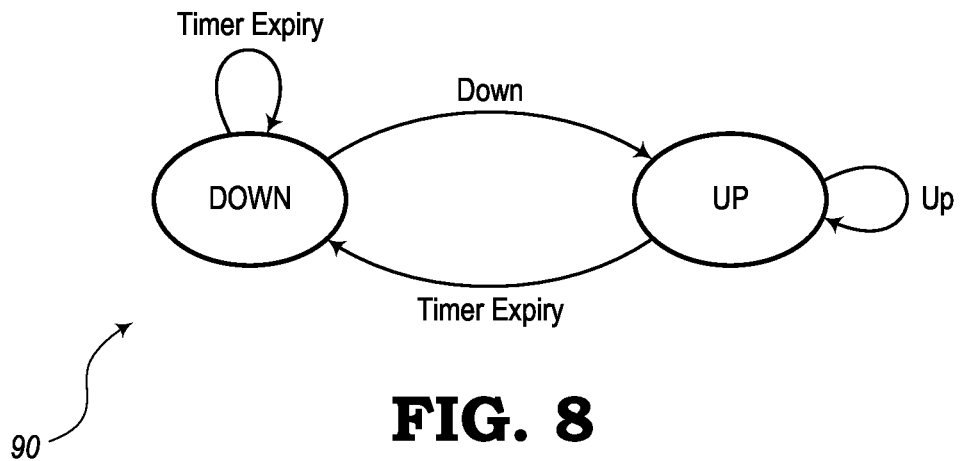
FIG. 8 is a diagram illustrating a Finite State Machine (FSM) associated with operation of a revised-BFD policy used in the revised-BFD system of FIG. 6, according to various embodiments.

FIG. 8 is a diagram illustrating a Finite State Machine (FSM) 90 associated with operation of the revised-BFD policy used in the revised-BFD system 80 of FIG. 6. Upon receiving a request with a DOWN state, the FSM 90 transitions the state to UP. Thereafter, while continuing to receive UP states, the FSM 90 stays in the UP state. However, when there is a timeout (e.g., timer expiry), the FSM 90 transitions to the DOWN state from the UP state, or, if already in the DOWN state, remains in the DOWN state.

It should therefore be noted that the FSM 90 shows a simplified version of the BFD and S-BFD protocol. Since a single entity (e.g., Node S, computing system 60, revised-BFD entity 74, Initiator 88, etc.) may be configured to generate and consume the same request packet, other aspects like the INIT state of BFD, the three-way handshaking procedures of BFD and S-BFD, and regular timer manipulation processes of BFD and S-BFD have been eliminated to create the present BFD Lite embodiments.

These solutions may be applicable for platforms having "control-plane assisted" BFD hardware implementation and/or in implementations where full-fledged an FSM resides in hardware. Other security and BFD authentication aspects defined in RFC 5880 may remain the same. In these embodiments of the present disclosure, detected faults are due to timeout. Thus, the only indication of a fault is the timeout situation, which is described below with respect to FIGS. 9 and 10.

Figure 9:
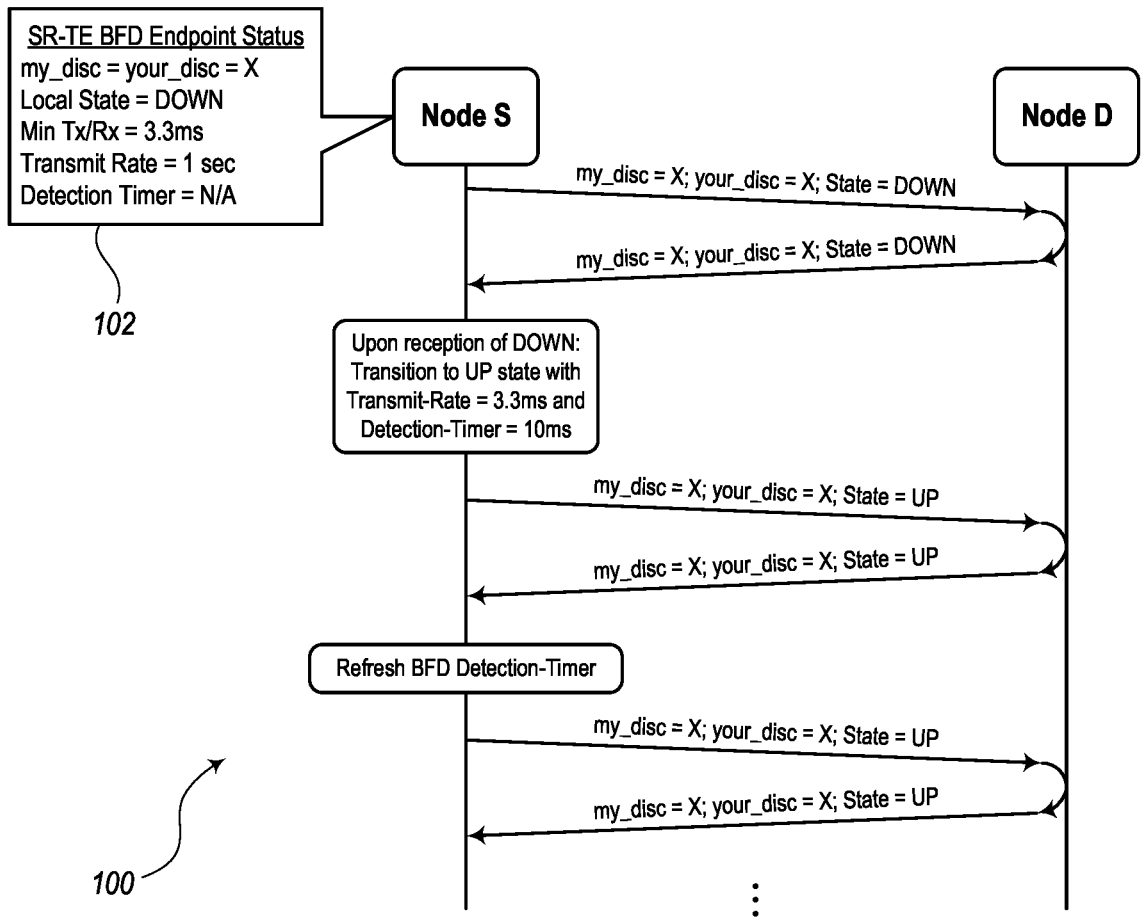
FIG. 9 is a diagram illustrating revised-BFD requests transmitted between the source node and destination node for checking continuity, according to various embodiments.

FIG. 9 is a diagram illustrating an embodiment of a transmission chart 100 of revised-BFD requests transmitted between Nodes S and Node D for checking continuity. Node S includes a status 102 as an SR-TE BFD endpoint. The status 102 includes My Discriminator=Your Discriminator=X. The local state is DOWN. The min Tx/Rx is set to 3.3 ms. The transmit rate is set to 1 sec. Also, the detection timer is N/A.

According to the revised-BFD procedures of the present disclosure, Node S creates a BFD request packet (as described above). In particular, the BFD request packet includes a revised-BFD request (e.g., revised-BFD request 85), which includes the My Discriminator, Your Discriminator, and State information. In this example, since there are not faults in the forward SR-TE tunnel to Node D, Node D follows the forwarding labels for a return path, which may include a number SIDs specifically defining the return path or a B-SID that may be expanded by Node D to include SIDs of the segments defining the return path. Either way, Node D simply forwards the revised-BFD request to the next hop without involvement by its Reflector. Thus, the revised-BFD request is transmitted back to Node S with the unchanged BFD request packet information. That is, the discriminator values are still set to X and the state is still DOWN.

Then, upon reception of the BFD request, Node S is configured, according to the revised-BFD session, to transition to the UP state (e.g., according to the FSM 90). Also, the status 102 may be changed according to timing information. For example, the transmit rate in this example is changed to 3.3 ms and the detection time is changed to 3×3.3 ms=10 ms. With the status in the UP state, Node S may then periodically send the revised-BFD request (as shown) to Node D, which will again return the packet without processing the BFD request. When Node S receives the request with the state set to UP, Node S refreshes the BFD detection timer and repeats the continuity test to determine the liveness between Node S and Node D.

Figure 10:
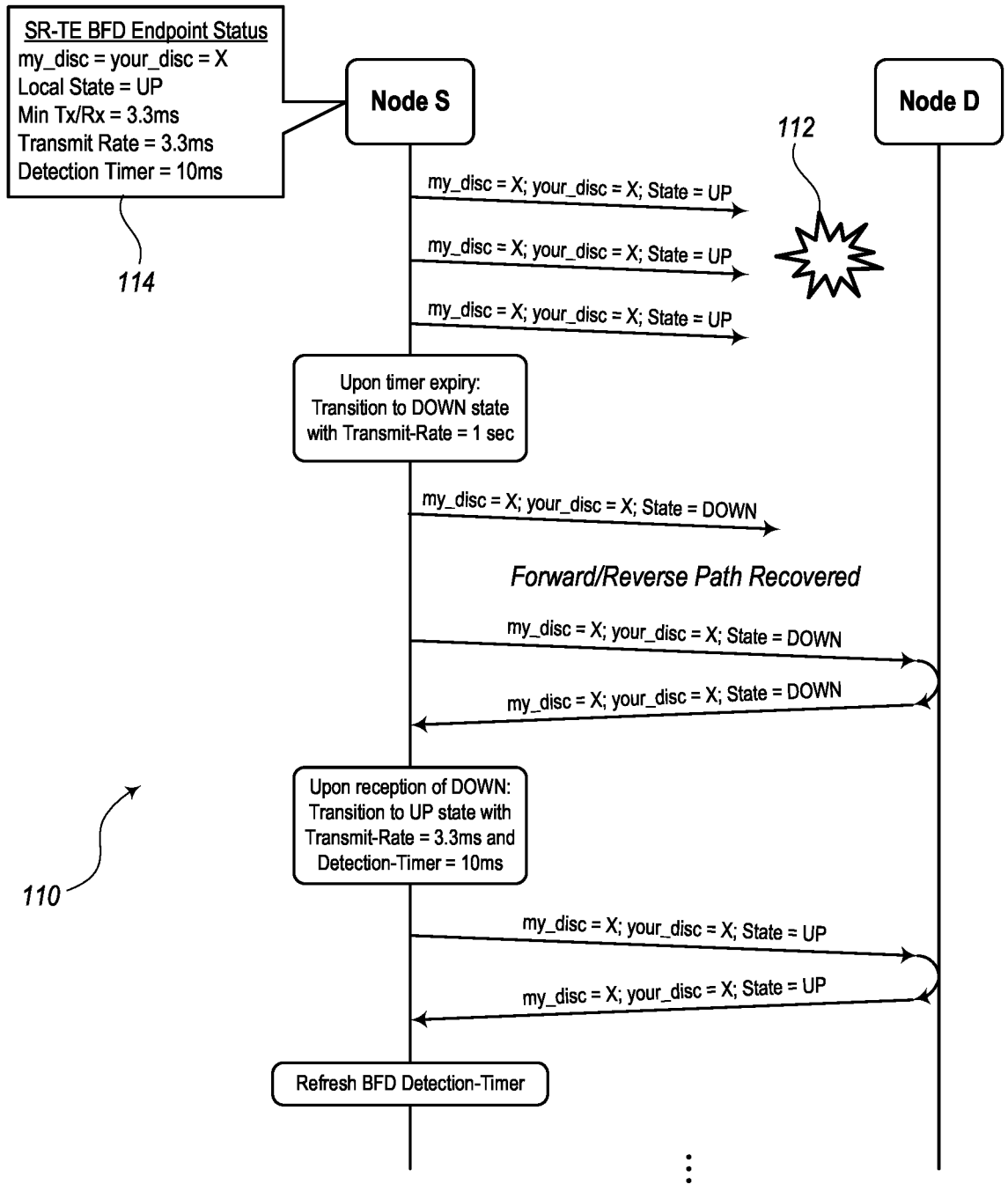
FIG. 10 is a diagram illustrating the transmission of revised-BFD requests when a fault is detected along a path between the source node and destination node and when the path is recovered, according to various embodiments.

FIG. 10 is a diagram illustrating an embodiment of a transmission chart 110 of the transmission of the revised-BFD requests and shows when a fault 112 is detected along either the forward SR-TE path 83 or reverse SR-TE path 84 between Node S and Node D. FIG. 10 also shows when the faulty path is recovered to allow the resuming of the continuity test. In this example, the status 114 of Node S, as the SR-TE BFD endpoint, includes My Discriminator=Your Discriminator=X. The local state is UP (from FIG. 9), although the same scenario may apply when the initial request is sent while the state is DOWN. The min Tx/Rx is set to 3.3 ms. Also, the transmit rate is set to 3.3 ms and the detection timer is 10 ms, based on the ongoing continuity test as set during the operation as described with respect to the example of FIG. 9.

However, because of the fault 112, Node D does not receive the BFD request packet in the forward direction or Node S does not receive the "reflected" BFD request packet in the reverse direction. The transmission is attempted, but a response is not received within the 3.3 ms window. The transmission is attempted again, but still a response is not received within the min Tx/Rx window. When the detection timer (e.g., 10 ms) expires after three failed attempts, Node S senses the fault 112. On timer expiry, the session transitions to the DOWN state, sets the transmit rate to one second, and keeps the My Discriminator and Your Discriminator at X. Node S may then restart the continuity detection process and send the revised-BFD request until the fault 112 is resolved and the forward or reverse SR-TE path 83, 84 is fixed or recovered. Operation then continues as before as described with respect to FIG. 9.

Process for Performing a Revised-BFD Procedure

Figure 11:
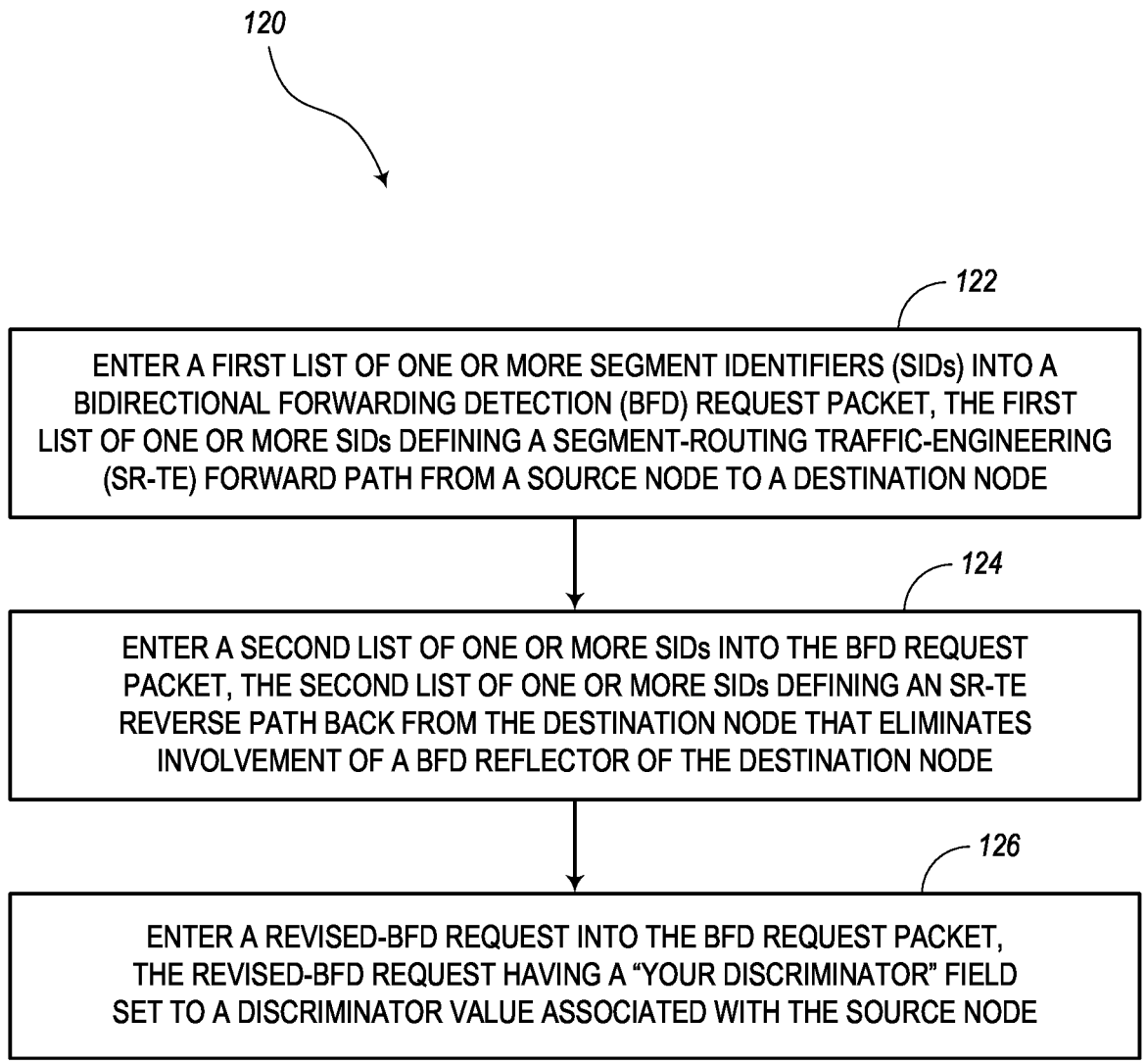
FIG. 11 is a flow diagram illustrating a process for performing a revised-BFD procedure for checking continuity between a source node and destination node, according to various embodiments.

FIG. 11 is a flow diagram illustrating an embodiment of a process 120 for performing a revised-BFD procedure for checking continuity between a source node and destination node. As shown, the process 120 includes the step of entering a first list of one or more Segment Identifiers (SIDs) into a Bidirectional Forwarding Detection (BFD) request packet, as indicated in block 122. The first list of one or more SIDs defines a Segment-Routing Traffic-Engineering (SR-TE) forward path (e.g., forward SR-TE path 83) to the destination node. The process 120 also includes the step of entering a second list of one or more SIDs into the BFD request packet, as indicated in block 124. The second list of one or more SIDs defines an SR-TE reverse path (e.g., reverse SR-TE path 84) back from the destination node that eliminates involvement of a BFD reflector of the destination node. Also, the process 120 includes the step of entering a revised-BFD request into the BFD request packet, as indicated in block 126, where the revised-BFD request has a Your Discriminator field set to a discriminator value associated with the source node.

According to some embodiments, the process 120 may further include the step of transmitting the BFD request packet to the destination node via the SR-TE forward path. The second list of one or more SIDs may be stacked in the BFD request packet according to the Multiprotocol Label Switching (MPLS) protocol such that the destination node denies visibility of the revised-BFD request by the BFD reflector and returns the BFD request packet back to the source node via the SR-TE reverse path. A source node that is configured to execute the process 120 may include a BFD initiator configured to process the revised-BFD request that was previously unprocessed by the BFD reflector of the destination node, whereby the BFD initiator does not drop the revised-BFD request on account of the Your Discriminator field being set to the discriminator value associated with the source node.

The process 120 may also include the step of entering an Internet Protocol (IP) header into the BFD request packet and setting a destination IP address of the IP header to 127.x.x.x reserved for loopback, whereby the destination IP address remains the same in the SR-TE reverse path. The process 120 may also include the step of entering a User Datagram Protocol (UDP) header into the BFD request packet, set a source port number of the UDP header to an unreserved value, and set a destination port number of the UDP header to 3784 as defined in RFC 5881, whereby the source port number and destination port number may be configured to remain the same in the SR-TE reverse path.

The step of entering the second list of one or more SIDs into the BFD request packet for defining the SR-TE reverse path may include the step of entering a Binding SID (B-SID) that the destination node expands to form the second list. According to some embodiments, the SR-TE forward path and SR-TE reverse path may include the same intermediate nodes between the source node and destination node.

According to additional embodiments, the process 120 may include the step of setting a State field of the revised-BFD request to DOWN, and utilize a Finite State Machine (FSM) having a revised-BFD policy associated with the revised-BFD request. For example, the FSM may be configured, in accordance with the revised-BFD policy of the present disclosure, to transition the State field to UP in response to receiving the revised-BFD request via the SR-TE reverse path. The FSM may be configured to transition the State field to DOWN in response to a timeout event that indicates a continuity fault. For example, the procedures may be irresponsive to an INIT state, and three-way handshaking procedures. The revised-BFD request described herein may involve an Internet-Protocol Single-Hop (IP-SH) operation.

CONCLUSION

Therefore, the systems and methods of the present disclosure may leverage IP-SH BFD payload and may also leverage B-SID expansion for the reverse policy path for monitoring SR-TE path. Also, the remote (or tail-node) discriminator value can be equal to the local (head-node) discriminator value. The simplified BFD (or BFD Lite) described herein includes a single-ended BFD endpoint configuration, where operation is limited to only the head-end. The embodiments herein also introduce a new UDP source port for BFD on SR-TE paths.

As a result of providing simplified BFD to nodes on a network, a node, which is equipped with the revised-BFD entity 74 and/or other systems and methods for performing the revised-BFD procedures described herein, is configured to perform reliable liveliness monitoring of SR-TE paths defined by an administrator or according to Path Computation Element Protocol (PCEP). Also, using an SR-TE return path will avoid indeterministic behavior due to an IP path. This in turn may provide improved network resiliency and stability. Also, these implementations may be incorporated in various forms, such as in software programs and/or hardware elements (e.g., chipsets) that support BFD and/or S-BFD.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A source node configured to perform a continuity test with respect to a destination node, the source node comprising:
   a processing device, and
   a memory device configured to store a computer program having instructions that, when executed, enable the processing device to
      enter a first list of one or more Segment Identifiers (SIDs) into a Bidirectional Forwarding Detection (BFD) request packet, the first list of one or more SIDs defining a Segment-Routing Traffic-Engineering (SR-TE) forward path to the destination node,
      enter a second list of one or more SIDs into the BFD request packet, the second list of one or more SIDs defining an SR-TE reverse path back from the destination node that eliminates involvement of a BFD reflector of the destination node, and
      enter a revised-BFD request into the BFD request packet, the revised-BFD request having a Your Discriminator field set to a discriminator value associated with the source node.

2. The source node of claim 1, wherein the instructions further enable the processing device to transmit the BFD request packet to the destination node via the SR-TE forward path.

3. The source node of claim 2, further comprising a BFD initiator configured to process the revised-BFD request.

4. The source node of claim 1, wherein the instructions further enable the processing device to enter an Internet Protocol (IP) header into the BFD request packet and set a destination IP address of the IP header to 127.x.x.x reserved for loopback, whereby the destination IP address remains the same in the SR-TE reverse path.

5. The source node of claim 1, wherein the instructions further enable the processing device to
   enter a User Datagram Protocol (UDP) header into the BFD request packet,
   set a source port number of the UDP header to an unreserved value, and
   set a destination port number of the UDP header to 3784 as defined in RFC 5881,
   whereby the source port number and destination port number remain the same in the SR-TE reverse path.

6. The source node of claim 1, wherein the SR-TE forward path and SR-TE reverse path includes intermediate nodes between the source node and destination node determined at the source node.

7. The source node of claim 1, wherein the instructions further enable the processing device to
   set a State field of the revised-BFD request to DOWN, and
   utilize a Finite State Machine (FSM) having a revised-BFD policy associated with the revised-BFD request, wherein the FSM is configured, in accordance with the revised-BFD policy, to transition the State field to UP in response to receiving the revised-BFD request via the SR-TE reverse path.

8. The source node of claim 7, wherein the FSM is configured to transition the State field to DOWN in response to a timeout event that indicates a continuity fault and is irresponsive to an INIT state, and three-way handshaking procedures.

9. The source node of claim 1, wherein the revised-BFD request involves an Internet-Protocol Single-Hop (IP-SH) operation.

10. A non-transitory computer-readable medium configured to store computer logic having instructions for performing a continuity test between a source node and a destination node, wherein, when executed, the instructions are configured to cause one or more processing devices to:
   enter a first list of one or more Segment Identifiers (SIDs) into a Bidirectional Forwarding Detection (BFD) request packet, the first list of one or more SIDs defining a Segment-Routing Traffic-Engineering (SR-TE) forward path from the source node to the destination node,
   enter a second list of one or more SIDs into the BFD request packet, the second list of one or more SIDs defining an SR-TE reverse path from the destination node to the source node, where involvement of a BFD reflector of the destination node is eliminated, and
   enter a revised-BFD request into the BFD request packet, the revised-BFD request having a Your Discriminator field set to a discriminator value associated with the source node.

11. The non-transitory computer-readable medium of claim 10, wherein the instructions further cause the one or more processing devices to transmit the BFD request packet from the source node to the destination node via the SR-TE forward path.

12. The non-transitory computer-readable medium of claim 11, wherein the source node includes a BFD initiator configured to process the revised-BFD request.

13. The non-transitory computer-readable medium of claim 10, wherein the instructions further cause the one or more processing devices to enter an Internet Protocol (IP) header into the BFD request packet and set a destination IP address of the IP header to 127.x.x.x reserved for loopback, whereby the destination IP address remains the same in the SR-TE reverse path.

14. The non-transitory computer-readable medium of claim 10,
   wherein the instructions further cause the one or more processing devices to
   enter a User Datagram Protocol (UDP) header into the BFD request packet,
   set a source port number of the UDP header to an unreserved value, and
   set a destination port number of the UDP header to 3784 as defined in RFC 5881,
   whereby the source port number and destination port number remain the same in the SR-TE reverse path.

15. A method comprising the steps of:
   entering a first list of one or more Segment Identifiers (SIDs) into a Bidirectional Forwarding Detection (BFD) request packet, the first list of one or more SIDs defining a Segment-Routing Traffic-Engineering (SR-TE) forward path to a destination node,
   entering a second list of one or more SIDs into the BFD request packet, the second list of one or more SIDs defining an SR-TE reverse path back from the destination node that eliminates involvement of a BFD reflector of the destination node; and
   entering a revised-BFD request into the BFD request packet, the revised-BFD request having a Your Discriminator field set to a discriminator value associated with a source node.

16. The method of claim 15, wherein the SR-TE forward path and SR-TE reverse path include intermediate nodes between the source node and destination node determined at the source node.

17. The method of claim 15, further comprising the steps of:
   setting a State field of the revised-BFD request to DOWN; and
   utilizing a Finite State Machine (FSM) having a revised-BFD policy associated with the revised-BFD request;
   wherein the FSM is configured to
      transition the State field to UP in response to receiving the revised-BFD request via the SR-TE reverse path, and
      transition the State field to DOWN in response to a timeout event that indicates a continuity fault,
      whereby the FSM is irresponsive to an INIT state, and three-way handshaking procedures.

18. The method of claim 15, wherein the revised-BFD request involves an Internet-Protocol Single-Hop (IP-SH) operation.

* * * * *